United States Patent

[11] 3,542,349

[72] Inventors Ryo Ando;
Teruo Shimotsuma; Tsutomu Fukushima; Kazuo Kunioka, c/o Gijutsu Kenkyusho, Nippon Kokan Kabushiki Kaisha, 2730, Minami Watarida cho, Kawasaki-shi, Japan
[21] Appl. No. 111
[22] Filed Jan. 2, 1970
Continuation-in-part of Ser. No. 775,060, Nov. 12, 1968, abandoned.
[45] Patented Nov. 24, 1970
[32] Priority Nov. 11, 1968
[33] Japan
[31] No. 42/72249

[54] RADIATION-TYPE HEATING FURNACE WITH ATMOSPHERE REGULATION
10 Claims, 5 Drawing Figs.
[52] U.S. Cl. .................................................. 263/40, 263/6
[51] Int. Cl. ........................................................ F27b 9/04
[50] Field of Search ............................................ 263/6, 8, 40, 43; 148/16.7

[56] References Cited
UNITED STATES PATENTS

| | | | |
|---|---|---|---|
| 3,086,764 | 4/1963 | Beck | 263/8 |
| 3,170,681 | 2/1965 | Davies | 263/40 |
| 3,193,263 | 7/1965 | Ruff | 263/8 |

Primary Examiner—John J. Camby
Attorney—Flynn and Frishauf

ABSTRACT: A radiation type heating furnace with atmosphere regulation has a combustion region using an oxidizing flame having high temperature and an atmosphere regulating region surrounding a substance to be heated with a heat radiative partition therebetween. The atmosphere is regulated in order to give it a reducing, neutral or oxidizing nature with small heat loss and high efficiency.

Patented Nov. 24, 1970

3,542,349

RADIATION-TYPE HEATING FURNACE WITH ATMOSPHERE REGULATION

This is a continuation-in-part of application Ser. No. 775,060, filed Nov. 12, 1968, now abandoned.

The present invention relates to a heating furnace adapted to heat substances by radiation heat. More specifically, in the furnace of the invention, the atmosphere in contact with the substance to be heated can be easily regulated so as to have a reducing, neutral, or oxidizing nature with only a small heat loss and a high efficiency.

Heretofore, heating furnaces using oxidizing flames at high temperatures have been utilized in order to raise the temperature of a substance by merely heating the body. In this case, the atmosphere in contact with the substance must necessarily be of an oxidizing nature, so that the body to be heated is placed in a condition whereby it is likely to be oxidized. On the other hand, there are several methods in which a heating reduction is effected utilizing a reducing flame such as used in the S-L method as a means for heating while the body is being reduced. One method includes a double kiln, the outer cylinder of which is used as a heating zone with an oxidizing flame at high temperature, the material to be heated being charged to the inner cylinder thereof where the atmosphere is made reductive so that the material to be heated is heat reduced. Other methods use an electric furnace, a radiant tube refining furnace, a muffle furnace, etc.

In heating a substance in an oxidizing atmosphere, there is no problem if an oxidizing flame at high temperature is used. However, when the substance is to be heated in a neutral or reducing atmosphere, it is difficult to regulate the atmosphere. Furthermore, when heating is to be carried out in a reducing atmosphere, for example, a reducing flame having a low temperature must be used. In a double kiln, a radiant tube heating furnace, muffle furnace etc., since the heating is affected through walls or the inner tubes, it is impossible to heat the substance up to a very high temperature. Thermal efficiency is also decreased. Therefore, it is desirable to employ a furnace which enables one easily to heat a substance to a high temperature and to regulate the atmosphere as well.

The object of the present invention is to satisfy these requirements.

According to this invention, a radiation type heating furnace having a regulatable atmosphere comprises a combustion region using an oxidizing flame at a high temperature and an adjustable atmosphere region surrounding a substance to be heated. The combustion region and the adjustable atmosphere or regulatable region are partitioned or separated by means of a heat radiative member, such as a reticular member, a heat radiative plate, or the like, so that the substance to be heated can be heated up to a high temperature while the atmosphere therearound can easily be regulated to a predetermined nature.

For a better understanding of the invention reference is made to the accompanying drawings, in which.

Figure 1:
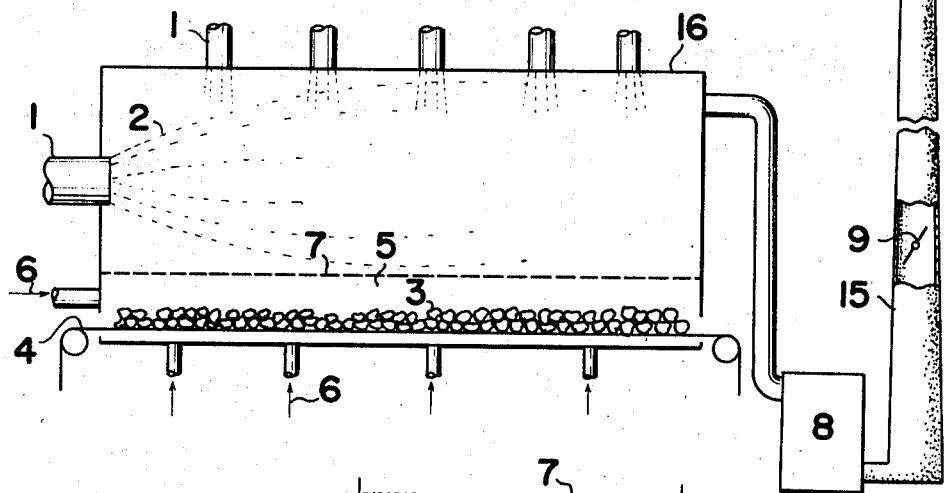
FIG. 1 is a general view showing an example of a continuous heating furnace embodying the present invention.

Referring now to the drawings, FIG. 1 is an example of a continuous-type heating furnace. At the upper portion of the furnace, an appropriate number of burners 1 are mounted forming a combustion region 2 in which an oxidizing flame having a high temperature is obtained. The substance to be heated is conveyed continuously by a conveying means 4 such as a belt conveyor. An atmosphere regulating region 5 covers the substance to be heated, and gas for this atmosphere is supplied from one or more atmosphere regulating gas inlets 6. Between the oxidizing flame and the atmosphere regulating gas, that is, between the combustion region 2 and the atmosphere regulating region 5, there is provided a partition wall made of a heat radiative member, such as a reticular member 7 or a transparent or semitransparent heat-resisting plate. Atmosphere regulating gas may be supplied via inlets 6 under pressure, depending upon the particular system and upon the type of partition 7 being used. This aspect will be discussed hereinbelow. For the reticular member 7, a wire gauze of nichrome wire, Kanthal wire or tungsten wire may be used, and for the heat-resisting plate, a heat-resisting glass such as quartz glass may be used. Heat exchanger 8 is provided between the furnace and an exhaust port 15 having a damper 9, where the material undergoing the heat exchange is used for preheating the air for combustion in a manner well known in the art. By using the reticular member 7 or the like in this manner, the oxidizing flame and the radiation heat of the inner wall 16 of the furnace can be utilized effectively in the heating of a substance without being absorbed by the wall on the way thereto. For example, when $CO_2$ gas is charged through inlets 6 to obtain the reducing atmosphere, carbon monoxide gas burns on the reticular member 7 (which may comprise wire gauze) by a reaction accelerating effect of the reticular member. By regulating the pressure in the furnace, the atmosphere regulating gas can be used effectively for heating the cold material.

The pressure in the furnace may be regulated, for example, by introducing the atmosphere regulating gas under pressure into the atmosphere regulating region 5. In this manner, combustion gas in combustion region 2 is prevented from permeating into the atmosphere regulating region through the reticular member 7. This effectively insures that the material to be heated is heated substantially in the desired atmosphere without contamination by the combustion atmosphere. The pressure may also be regulated by constricting the outlet from region 5 to pressurize the gas in region 5. When a transparent or semitransparent heat resisting plate is used in place of the reticular plate 7, there is no necessity to introduce the atmosphere regulating gas under pressure since the heat resistant plate will prevent combustion gas from entering the atmosphere regulating region.

Figure 2:
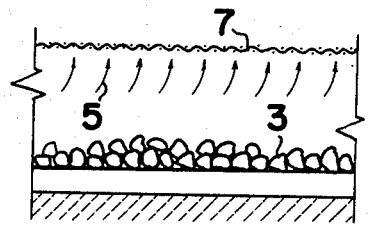
FIG. 2 is a view of part of a heating furnace utilizing a reducing atmosphere.

FIG. 2 shows the reducing atmosphere 10 which was supplied to the substance to be heated 3, burning on the reticular member 7. A substance acting as a catalyst may also be added to our associated with the reticular member 7 to accelerate combustion.

Figure 3A:
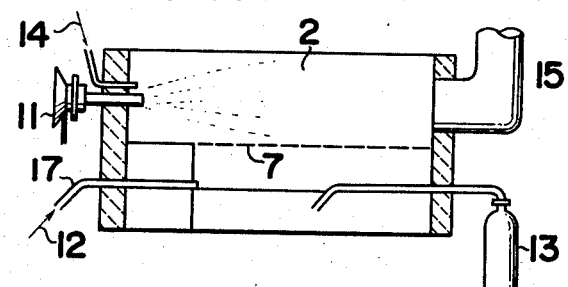
FIGS. 3A and 3B are general views of a furnace used as an experimental example.
Figure 3B:
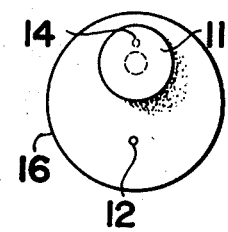

In the furnace shown in FIGS. 3A and 3B, a Bunsen burner 11 is mounted on one side of the furnace and burnt coke gas is charged via burner 11 into the furnace to make the upper portion thereof a combustion region 2. Into the lower region below the reticular member 7, a coke gas having a composition as shown in Table 1 was blown via inlet 17 to act as an atmosphere regulating gas 12. Gas 12 was sampled from the lower region by means of a gas sampling apparatus for analysis. The result of the analysis is shown in Table 11. A secondary air supply tube 14 is included, as well as a chimney or exhaust pipe 15.

TABLE I

| Composition: | Percent |
|---|---|
| $CO_2$ | 2.4 |
| $O_2$ | 0.2 |
| $CO$ | 5.9 |
| $CH_3$ | 32.5 |
| $H_2$ | 53.6 |
| $N_2$ | 1.6 |
| Hydrocarbon | 3.8 |

TABLE II

| | $CO_2$ | $CO$ | $CH_4$ | $H_2$ | $N_2$ | $C_2H_4$ | $C_2H_6$ and others |
|---|---|---|---|---|---|---|---|
| No. 1 | 7.00 | 6.25 | 8.70 | 22.50 | 52.65 | 1.30 | 1.52 |
| No. 2 | 6.40 | 6.25 | 9.40 | 24.40 | 50.05 | 1.80 | 1.60 |

In this embodiment, the pressure in the furnace is not regulated, and the quantity of gas blown is not adjusted so as to regulate the atmosphere. However, it will be seen from these results that a reducing atmosphere in the lower region below the reticular member can easily be maintained by blowing a reducing gas thereto. Very noteworthy in this example is that the quantity of hydrogen contained in the coke gas blown into the furnace is decreased considerably. An element which has a quick combustion speed such as hydrogen seems to burn easily on a reticular member or in the combustion region, and the composition of the atmosphere regulating gas becomes somewhat different from that of the gas blown in. As a result, the atmosphere is more or less different as compared with the case of an atmosphere regulating furnace where partition walls or radiant tubes are employed, yet the original purpose of the invention is still achieved. Improved results would be obtained, that is, the composition of the regulating gas would be more uniform, when the atmosphere regulating gas is blown in under pressure so that the pressure in the region below partition 7 is greater than that above region 7.

Figure 4:
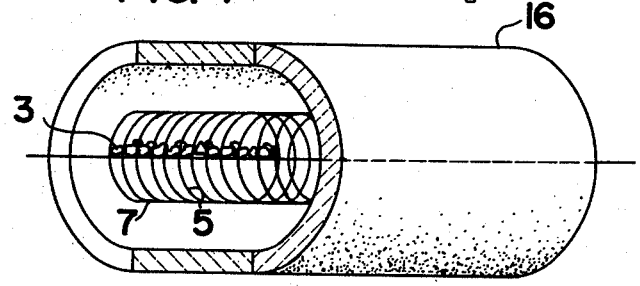
FIG. 4 is a part-sectional, part-elevational view of another embodiment of a continuous-type heating furnace.

FIG. 4 shows another embodiment where the method of the present invention is applied on a continuous type heating or a heat treating furnace of another type. A cylindrical, reticular member 7 is mounted at the central part of the cylindrical furnace body. Between the furnace wall 16 and the reticular member the combustion region 2 is formed, and the substance to be heated 3 is adapted to be moved from the outside and through the atmosphere regulating region 5 inside the reticular member 7.

In the present invention, the heating is effected by using an oxidizing flame having high temperature, as described above. Since the atmosphere surrounding the substance to be heated can be regulated easily at a predetermined value, it is possible to utilize the radiation heat effectively from the furnace wall and the flame without loss of heat on the way therethrough, while reducing, maintaining neutral or oxidizing the substance to be heated. The best regulation is achieved by regulating pressures in the furnace as previously described. Thus, an efficient heating can be carried out at higher temperatures with an inexpensive installation.

The present invention can be utilized for many heating furnaces, such as continuous reducing furnaces, refining and annealing furnaces, for ores, cokes and pellets; heating furnaces or soaking furnaces for steel material or billets, or melting furnace for metals, etc. Heat exchangers are preferably mounted before the exhaust port. The combination of the exhaust port and the heat exchanger permits adjustment of the external atmosphere drawn in by regulating the pressure within the furnace and also utilizes effectively the exhaust heat.

The present invention can also be applied to various atmosphere furnaces such as batch system heating or melting furnaces, vertical type heat treating furnaces, rotary hearth type heating furnaces, vertical type heating or melting furnaces, heating or melting furnaces with partition walls, etc.

We claim:

1. A radiant heating furnace for regulating the composition of the atmosphere adjacent a substance to be heated, comprising:
   a combustion region including means forming a high temperature oxidizing flame therein;
   an atmosphere regulation region in which the substance to be heated is located;
   a reticular member separating said two regions; and
   means for admitting atmosphere regulating gas into said atmosphere regulating region, said atmosphere regulating gas being under pressure to prevent gas in said combustion region from entering said atmosphere regulating region.

2. A furnace as claimed in claim 1, wherein a catalytic material is present on said heat reticular member to accelerate combustion of the atmosphere regulating gas.

3. A furnace as claimed in claim 1, wherein pressure regulating means are provided at the outlet from said combustion region.

4. A furnace as claimed in claim 1, wherein a heat exchanger is mounted between the combustion region and an exhaust port to the atmosphere therefrom.

5. A furnace as claimed in claim 1, wherein the atmosphere regulating gas is formed from coke gas.

6. A furnace as claimed in claim 1, wherein the atmosphere regulating gas is formed from carbon monoxide.

7. A radiant heating furnace for regulating the composition of the atmosphere adjacent a substance to be heated, comprising:
   a combustion region including means forming a high temperature oxidizing flame therein;
   an atmosphere regulating region in which the substance to be heated is located;
   a transparent heat radiative plate separating said two regions; and
   means for admitting atmosphere regulating gas into said atmosphere regulating region, said plate enabling heating of said substance in a pure desired atmosphere.

8. A furnace as claimed in claim 7, wherein said heat radiative plate is a heat-resisting glass plate.

9. A furnace as claimed in claim 7, wherein pressure regulating means are provided at the outlet from said combustion region.

10. A furnace as claimed in claim 7, wherein a heat exchanger is mounted between the combustion region and an exhaust port to the atmosphere therefrom.